UNITED STATES PATENT OFFICE.

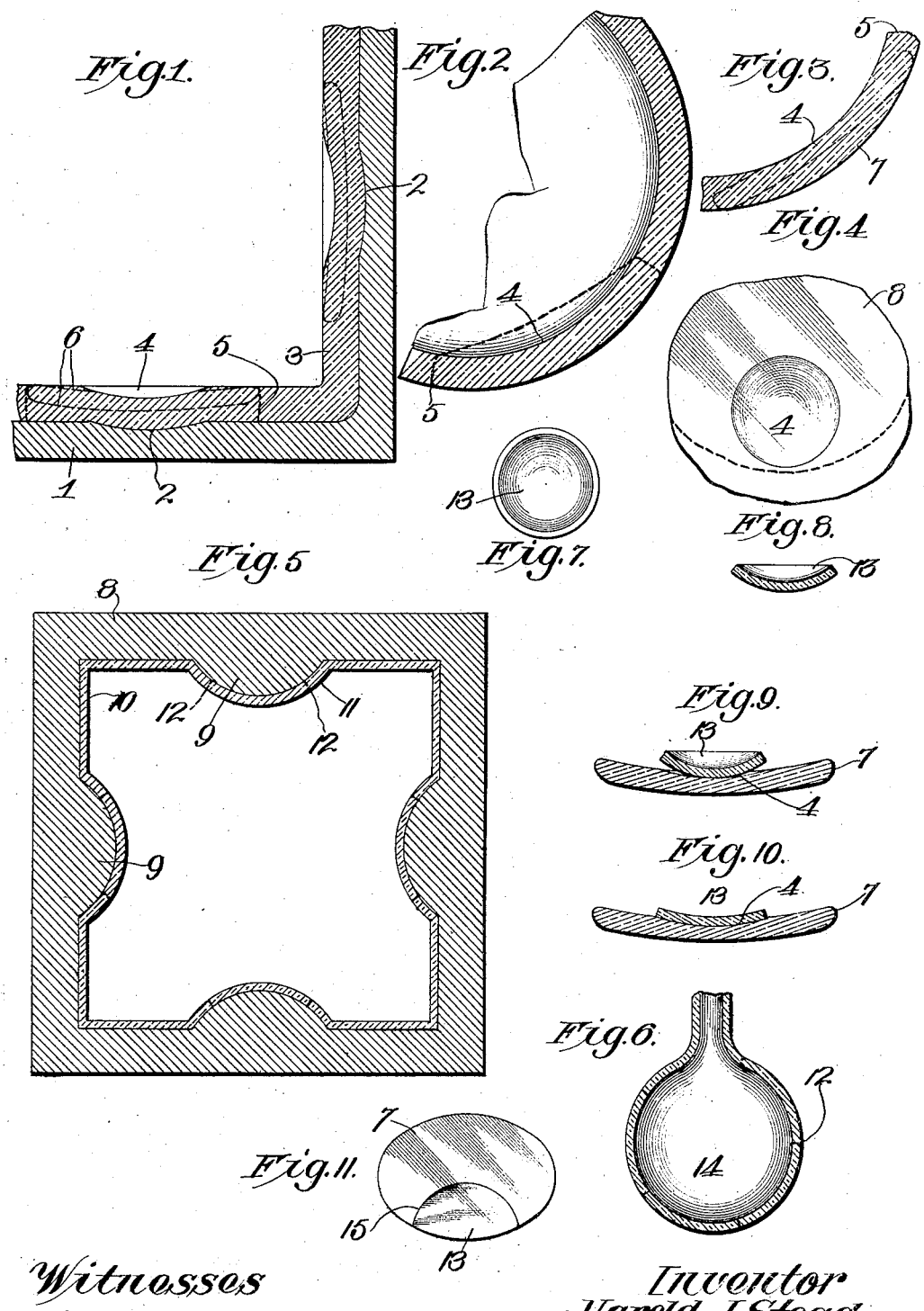

HAROLD J. STEAD, OF KANSAS CITY, MISSOURI, ASSIGNOR, BY DIRECT AND MESNE ASSIGNMENTS, TO THE STEAD LENS COMPANY, OF KANSAS CITY, MISSOURI, A CORPORATION OF MISSOURI.

METHOD OF MAKING BIFOCAL LENSES.

No. 890,813.　　　　Specification of Letters Patent.　　　　Patented June 16, 1908.

Application filed July 12, 1907. Serial No. 383,528.

*To all whom it may concern:*

Be it known that I, HAROLD J. STEAD, a citizen of the United States, residing at Kansas City, in the county of Jackson and State of Missouri, have invented certain new and useful Improvements in Methods of Making Bifocal Lenses, of which the following is a specification.

This invention relates to a method of making bifocal lenses, and more especially lenses of that type composed of two pieces of glass of different density secured in superposed relation.

Heretofore one method of producing bifocal lenses has been to secure the two pieces of glass together with transparent cement. Another method has been to weld such pieces of glass together, and I am aware that it has also been contemplated to produce lenses by blowing one of the pieces of glass upon the other. The first method is objectionable because the cement—under certain well known conditions—softens and permits of an independent movement of the small piece of glass forming the lower field of vision, the result being the cement assumes a wavelike appearance and renders such lower field of vision impractical until the small piece is removed and properly resecured in place. An objection to the second method is the expense involved in grinding each piece of glass separately. The third method is objectionable because the glass has to be blown to an undesirable thickness and then ground down before their accuracy can be determined, thus involving a loss by waste of material and labor.

My object is to produce a lens preferably by blowing crown glass into a suitable mold having segmental cavities to produce segmental glass projections of the desired curvature—or it can be blown into the form of a globe of proper curvature—and then cutting or otherwise severing the glass so that the slab thus produced shall contain a perfect concaved inner face. The next step is to blow flint glass into a mold to produce a jar having inwardly projecting spherical segments whose curvatures are sharper than the segmental cavities or countersinks of the crown glass. If desired the flint glass may be blown into the form of a globe, the curvature being sharper than that of the cavities or countersinks of the crown glass slab. The segments or flint glass are cut from the jar or from the globe as the case may be, in circular form. One of such segments is then placed centrally upon the countersink of one of the slabs of crown glass with its convex side down. The two pieces of glass are then placed in a furnace and subjected to a heat sufficient to cause the flint glass to melt and settle down into said countersink, or this object may be accomplished in any other suitable manner, as by electric heating or otherwise. This treatment results in the production of a blank bifocal lens without any possibility of imprisoning any air between the pieces because the flint glass is of uniform thickness and therefore melts uniformly and in its melting forces the air radially outward from the cavity or countersink of the crown glass. The bifocal blank thus produced is then cut to the required form and ground in the usual manner to produce a perfect bifocal lens.

Referring to the drawing,—Figure 1, is a horizontal section of a part of a mold and a part of a crown glass jar blown therein. Fig. 2, is a segment of a globe of crown glass. Fig. 3, is a section of one of the blanks of crown glass after it is cut from the globe. Fig. 4, is a face view of a segment after it is cut from the jar or globe. Fig. 5, is a horizontal section of a mold and of a jar of flint glass blown therein. Fig. 6 is a section of a blown glass globe. Fig. 7, is a plan view of one of the circular pieces of flint glass. Fig. 8 is a section of the same. Fig. 9, is a section showing the crown glass blank with a flint glass piece resting therein. Fig. 10, is a section showing such crown glass and flint glass pieces after they have been welded together. Fig. 11, is a face view of a completed bifocal lens.

In the said drawing, 1 indicates a mold, which in practice will preferably contain a large number of cavities 2, in its inner wall.

3 indicates a part of a jar of crown glass blown therein so as to produce the cavities or countersinks 4. The dotted lines 5, show the line of cleavage, that is the line on which the blanks of crown glass are cut from the jar, and 6 indicates the lines on which such piece of crown glass are preferably ground when ready to receive the flint glass, hereinafter described.

In Fig. 2, 5 indicates the line of cleavage of the globe of crown glass and 7 indicates where the crown glass blank is cut from said globe.

8 indicates a mold preferably in the form of a hollow jar or casing having inwardly projecting rounded bosses 9. 10 indicates a flint glass jar blown therein and forming segmental portions 11 from which circular pieces of the flint glass are cut out on the lines 12, the circular pieces being numbered 13.

In Fig. 6, 14 indicates a globe of flint glass, the lines 12 indicating the line of cleavage for the pieces 13.

In Fig. 11, a complete lens is shown and in practice the crown glass section 7 is of elliptical form and the flint glass section of substantially semicircular form, the line 15 indicating the upper edge of section 13, and forming a clear and distinct division between the upper and lower fields of vision.

It will be understood that my invention contemplates the idea of blowing or molding flint glass disks 13, as they are termed in the trade, for welding onto crown glass slabs without regard to how such slabs are made, and conversely contemplates the use of blown or molded crown glass slabs without regard to how the flint glass disks are made. I also contemplate the making in any way of crown glass slabs provided with countersinks and the pouring of molten flint glass into such cavities and then grinding both glasses to produce the complete lens.

From the above description it will be apparent that I have evolved a process for making bifocal lenses possessing the features of advantage enumerated as desirable and I wish it to be understood that I do not desire to be restricted to the exact methods of construction and treatment described, as it is obvious changes may be made which will not be a departure from the spirit and scope of the invention.

Having thus described the invention what I claim as new and desire to secure by Letters Patent is:—

1. The method of making bifocal lenses, the same consisting in blowing crown glass into a hollow mold having a rounded cavity or countersink in its inner side, then cutting a section from the crown glass on a line surrounding said cavity, then placing a flint glass disk upon the section of crown glass directly over said countersink, and then welding the crown glass section and the flint glass disk together by heating them until the flint glass disk settles down into and fills said countersink.

2. The method of making bifocal lenses, the same consisting in blowing crown glass into a hollow mold having a rounded cavity or countersink in its inner side, then cutting a section from the crown glass on a line surrounding said cavity, then placing a flint glass disk upon the section of crown glass directly over said countersink, then welding the crown glass section and the flint glass disk together by heating them until the flint glass disk settles down into and fills said countersink, and then grinding the bifocal blank thus produced into a bifocal lens.

3. The method of making bifocal lenses, the same consisting in blowing flint glass into a hollow mold having an inwardly projecting rounded portion on its inner side, then cutting a section—usually termed a disk—from the blown glass on a line surrounding said projection, then placing said flint glass disk upon a crown glass section having a countersink in its upper side and directly underlying the flint glass disk, and then welding the crown glass section and the flint glass disk together by heating them until the flint glass disk settles down into and fills the countersink.

4. The method of making bifocal lenses, the same consisting in blowing flint glass into a hollow mold having an inwardly projecting rounded portion on its inner side, then cutting a section—usually termed a disk—from the blown glass on a line surrounding said projection, then placing said flint glass disk upon a crown glass section having a countersink in its upper side and directly underlying the flint glass disk, then welding the crown glass section and the flint glass disk together by heating them until the flint glass disk settles down into and fills the countersink, and then grinding the bifocal blank thus produced into a bifocal lens.

5. The method of making bifocal lenses, the same consisting in blowing crown glass into a hollow mold having a rounded cavity or countersink in its inner side, then cutting a section from the crown glass on a line surrounding said cavity, then blowing flint glass into a hollow mold having an inwardly projecting rounded portion of sharper radius or curve than said countersink, then cutting a section—usually termed a disk—from the flint glass on a line surrounding said projection then placing the flint glass disk with its convex side down upon the crown glass section directly over and depending partially into said countersink, and then welding the crown glass section and the flint glass disk together by heating them until the flint glass disk settles down into and completely fills the countersink.

6. The method of making bifocal lenses, the same consisting in blowing crown glass into a hollow mold having a rounded cavity or countersink in its inner side, then cutting a section from the crown glass on a line surrounding said cavity, then blowing flint glass into a hollow mold having an inwardly projecting rounded portion of sharper radius or curve than said countersink, then cutting a section—usually termed a disk—from the flint glass on a line surrounding said projection, then placing the flint glass disk with its convex side down upon the crown glass section directly over and depending partially into said countersink, then welding the crown glass section and the flint glass disk together by heating them until the flint glass disk settles down into and completely fills the countersink, and then grinding the bifocal blank thus produced into a bifocal lens.

In testimony whereof I affix my signature, in the presence of two witnesses.

HAROLD J. STEAD.

Witnesses:
　H. C. RODGERS,
　G. Y. THORPE.